United States Patent
Kimura et al.

(10) Patent No.: US 6,642,913 B1
(45) Date of Patent: *Nov. 4, 2003

(54) LIGHT MODULATION ELEMENT, EXPOSURE UNIT, AND FLAT-PANEL DISPLAY UNIT

(75) Inventors: Koichi Kimura, Shizuoka (JP); Mitsuru Sawano, Shizuoka (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/487,296

(22) Filed: Jan. 19, 2000

(30) Foreign Application Priority Data

Jan. 20, 1999 (JP) .................................. 11-012031

(51) Int. Cl.⁷ .......................... G09G 3/34; G02B 26/00
(52) U.S. Cl. ........................... 345/84; 345/85; 345/86; 359/290; 359/291; 359/292; 359/293; 359/294; 359/295
(58) Field of Search ............................. 345/84, 85, 86, 345/108, 111, 105, 75.2, 74.1; 359/295, 291, 290, 292–294

(56) References Cited

U.S. PATENT DOCUMENTS

| | | | | |
|---|---|---|---|---|
| 5,858,564 A | * | 1/1999 | Tamura et al. | 428/690 |
| 5,914,760 A | * | 6/1999 | Daiku | 349/65 |
| 5,965,064 A | * | 10/1999 | Yamada et al. | 252/512 |
| 6,195,196 B1 | * | 2/2001 | Kimura et al. | 359/295 |
| 6,288,829 B1 | * | 9/2001 | Kimura | 359/291 |
| 6,327,071 B1 | * | 12/2001 | Kimura | 359/291 |
| 6,338,910 B1 | * | 1/2002 | Ishibashi et al. | 428/690 |
| 6,344,156 B1 | * | 2/2002 | Yamada et al. | 252/512 |

* cited by examiner

Primary Examiner—Bipin Shalwala
Assistant Examiner—Prabodh M. Dharia
(74) Attorney, Agent, or Firm—Sughrue Mion, PLLC

(57) ABSTRACT

A light modulation element which has a light guide body 11 for guiding light from a light source and a flexible thin film 12 having a phosphor 13 being provided facing the light guide body 11. The distance between the flexible thin film 12 and the light guide body 11 is changed by the electromechanical operation and light emission of the phosphor 13 excited by the guided light is controlled.

23 Claims, 10 Drawing Sheets

(a)

(a)

(b)

LIGHT MODULATION ELEMENT, EXPOSURE UNIT, AND FLAT-PANEL DISPLAY UNIT

BACKGROUND OF THE INVENTION

1. Field of the Invention

This invention relates to a light modulation element for modulating light from a light guide plate by means of a flexible thin film displaced by the electromechanical operation, an exposure unit for exposing a sensitive material to light with the light modulation element, and a flat-panel display unit for displaying an image with the light modulation element.

2. Description of the Related Art

For example, a liquid crystal display, a plasma display, and the like are named as representative thin flat-panel display units. However, in the liquid crystal display, light from backlight is allowed to pass through a large number of layers of a polarizing plate, a transparent electrode, and a color filter and a problem of lowering the light use efficiency arises; in the plasma display, diaphragm formation for discharge is executed for each pixel, thus it is difficult to provide high intensity at high efficiency as definition becomes high, and drive voltage is also high, leading to an increase in costs.

To solve such problems, in recent years, a flat-panel display unit for displacing a flexible thin film by the electromechanical operation, thereby modulating light from a light source for displaying an image has been developed. For example, such a flat-panel display unit is described in the following document:
Waveguide Panel Display Using Electromechanical Spatial Modulators, 1988, SID International Symposium Digest of Technical Papers, p.1022–p.1025.

The flat-panel display unit comprises a plurality of parallel optical waveguides 92 placed side by side on a front glass 91 and an LED (light emitting diode) array 95 connected to one end side of the optical waveguides 92 via a light guide member 94 having a microlens 93, as shown in FIG. 16. The LED array 95 comprises a plurality of light emission parts listed in one dimension and the light emission parts are provided in a one-to-one correspondence with the optical waveguides 92. A plurality of parallel flexible thin films (light switches) 96 are placed side by side above the optical waveguides 92 with a gap in a direction orthogonal to the optical waveguides 92. A rear glass 97 with only a part brought into contact with the flexible thin film 96 is placed above the flexible thin films 96 and supports the flexible thin films 96 displaceably.

In the described flat-panel display unit 90, when a voltage is applied to an electrode on a predetermined flexible thin film 96, the flexible thin film 96 is displaced by an electrostatic force in a direction in which it approaches the optical waveguide 92 side, as shown in FIG. 17. On the other hand, the LED array 95 emits light based on an image signal in synchronization therewith. Then, light advancing while being totally reflected in the optical waveguide 92 is guided into the flexible thin film 96, is reflected on a mirror 98 placed in the flexible thin film 96, and again is made incident on the optical waveguide 92 in a direction roughly perpendicular to the optical waveguide 92. The light made incident on the optical waveguide 92 in the direction roughly perpendicular to the optical waveguide 92 cannot hold the angle of total reflection, passes through the optical waveguide 92, and is emitted from the front glass 91 side.

According to the flat-panel display unit, the flexible thin film 96 is displaced by an electrostatic force, thus the operation of the flexible thin film 96 can be followed at high speed; in addition, unlike the liquid crystal display, light is not allowed to pass through a large number of layers and unlike the plasma display, diaphragm formation in a discharge section and a high-voltage drive circuit become unnecessary, so that it is made possible to provide a fast and inexpensive flat-panel display unit.

However, in the described flat-panel display unit 90 of the optical waveguide type, light is emitted by means of the reflection film in the flexible thin film, thus the emitted light involves a directivity and viewability worsens.

For color display, an LED array of a number of colors needs to be used as a light source and the light source and the optical system are limited; in addition, the unit configuration becomes intricate and the manufacturing process becomes complicated, resulting in an increase in costs.

SUMMARY OF THE INVENTION

It is therefore an object of the invention to provide a light modulation element less depending on a viewing angle, enabling highly efficient luminescent display, and providing high light use efficiency although the structure is simple, an exposure unit using the light modulation element, and a flat-panel display unit using the light modulation element.

According to this invention, there is provided a light modulation element comprising a light guide body for guiding light from a light source and a flexible thin film having a fluorescent material being provided facing the light guide body, characterized in that the distance between the flexible thin film and the light guide body is changed by the electromechanical operation and light emission of the fluorescent material excited by the guided light is controlled.

In the light modulation element, the flexible thin film having the fluorescent material is displaced by the electromechanical operation, whereby light guided from the light source into the light guide body is guided into the flexible thin film side for exciting the fluorescent material to emit light or light is not guided, whereby light modulation is executed. Since the flexible thin film thus comprises the fluorescent material, the structure and the manufacturing process of the element are simplified and the manufacturing costs can be reduced drastically. Since the fluorescent material is used, a scattered light emission state is entered at the light emission time and dependency of a viewing angle is scarcely produced, improving viewability. Further, light is applied directly to the fluorescent material, thus the fluorescent material can be excited for emitting light in high efficiency.

Various electromechanical effects of an electrostatic effect, an electromagnetic effect, a piezoelectric effect, etc., can be used as means of the electromechanical operation.

In this invention, the electromechanical operation is performed by generating an electrostatic force between the flexible thin film and the light guide body.

In the light modulation element, a voltage is applied to the flexible thin film and the light guide body, whereby an electrostatic force is generated between the flexible thin film and the light guide body, the flexible thin film performs the electromechanical operation smoothly at high speed and reliably by the generated electrostatic force, and stable light modulation is executed. The element using an electrostatic force can be provided by executing a simple manufacturing process for forming an electrode on the flexible thin film, and the costs can be reduced. Further, because of voltage drive type, it is made possible to execute low-voltage drive by optimizing the material and shape of the thin film.

In this invention, the light guide body is formed with a first electrode, the flexible thin film is formed with a second electrode, and a voltage is applied to the first electrode and the second electrode, thereby generating an electrostatic force.

In the light modulation element, a voltage is applied to the first electrode on the light guide body side and the second electrode on the flexible thin film side, whereby an electrostatic force is generated between the electrodes and the second electrode on the flexible thin film side is displaced, whereby light modulation is executed. Thus, a necessary structure can be formed on a single substrate and it is made possible to manufacture the element with high accuracy at low costs.

In this invention, the fluorescent material is a fluorescent layer formed on a surface of the flexible thin film.

In the light modulation element, the fluorescent film can be formed on the surface of the flexible thin film by a general thick film formation method, such as print, a spray method, or application, a vacuum film formation method, etc., so that the fluorescent materials can be provided easily and uniformly, and unevenness in light emission can be well prevented.

In this invention, the flexible thin film is made of a resin material and the fluorescent material made of a fluorescent pigment of fine particles is mixed in the flexible thin film.

In the light modulation element, the fluorescent material made of a fluorescent pigment of fine particles is mixed in the flexible thin film, whereby the flexible thin film and the fluorescent material can be formed at the same time, and resin has good workability, thus thin film formation is facilitated and it is made possible to use various flexible thin film materials and fluorescent materials.

In this invention, the flexible thin film is made of a resin material and the fluorescent material made of an organic fluorescent dye is melted into the flexible thin film.

In the light modulation element, the fluorescent material made of an organic fluorescent dye of fine particles is melted into the flexible thin film, whereby the fluorescent material can be distributed in the flexible thin film extremely uniformly in a simple process, and unevenness in light emission can be better prevented. Luminescent color proper to the organic fluorescent dye can be provided.

In this invention, the flexible thin film is formed with a reflection film for reflecting light emitted by the fluorescent material toward the light guide body.

In the light modulation element, the light emitted by the fluorescent material can be reflected in the light emission direction of the light modulation element without wasting the light directed in the direction opposite to the light emission direction of the element, and the light use efficiency can be enhanced.

In this invention, the reflection film is used as a second electrode.

In the light modulation element, the reflection film is also made to function as a second electrode, so that the element configuration is simplified, the manufacturing process can be simplified, and the costs can be reduced.

In this invention, a filter layer for allowing light from the light source to pass through and reflecting light emitted by the fluorescent material is placed between the fluorescent material of the flexible thin film and the light guide body.

In the light modulation element, a filter layer is placed between the light guide body and the fluorescent material provided on the flexible thin film, whereby when light is guided into the flexible thin film, light from the light source passes through the filter layer; on the other hand, light emitted by the fluorescent material is reflected on the filter layer, so that the light directed in the direction opposite to the light emission direction of the light modulation element can be reflected in the light emission direction. Thus, the light use efficiency of the light from the fluorescent material can be enhanced.

In this invention, light from the light source is guided from a side of the light guide body.

In the light modulation element, light from the light source is guided from the side of the light guide body and can be emitted from the surface of the light guide body. Therefore, the light source placement space in the thickness direction of the light modulation element is not unnecessary and the element can be thinned as much as possible In this invention, light from the light source is guided from a surface of the light guide body on an opposite side to the flexible thin film.

In the fight modulation element, it is made possible to guide the light from the light source from either the face or the back of the light guide body, the light guide area of the light guide body for receiving the light from the light source is increased, and light modulation for emitting light in high intensity can be executed easily.

In this invention, the light guide body is an optical waveguide.

In the light modulation element, the optical waveguide is formed as the light guide body, whereby the light guided into the optical waveguide can be modulated.

In this invention, the light modulation element comprises a plurality of parallel optical waveguides formed on a substrate, a plurality of light sources that can be controlled separately with at least one of the optical waveguides made to correspond to one pixel, and a plurality of flexible thin films orthogonal to the optical waveguides, wherein the quantity of flight from the light source is changed and light emission of the fluorescent material excited is controlled by the electromechanical operation of the flexible thin film.

In the light modulation element, the light quantity of each of the light sources provided in a one-to-one correspondence with the parallel optical waveguides is changed and light emission of the fluorescent material excited is controlled by the electromechanical operation of the flexible thin film, whereby it is made possible to control the light modulation elements separately, and it is also made possible to perform multiple gradation control by adjusting the light quantity.

In this invention, the light source is a light emission array element.

In the light modulation element, for example, light emission array elements of laser deflection and laser diode array, an inorganic LED array, an organic LED array, inorganic EL (electroluminescence), a fluorescent display tube, FED (field emission display), CRT (cathode-ray tube), etc., can be used, and high intensity can be easily provided by using a plurality of light emission elements in combination. To use a plurality of light modulation elements, the light modulation elements can be easily controlled separately.

In this invention, the light source is made up of a light emission body and a light modulation array element.

In the light modulation element, for example, a fluorescent lamp, a discharge lamp, etc., can be used as the light emission body and a liquid crystal array, an optical crystal array, etc., can be used as the light modulation array.

High-intensity light emission body is modulated by means of the light modulation array, whereby the light modulation elements can be driven separately for executing light modulation in high intensity.

In this invention, the light guide body is a light guide plate.

In the light modulation element, the light guide plate is formed as the light guide body, whereby the light guided into the light guide plate can be modulated.

The light modulation element in this invention is arranged like a one-dimensional or two-dimensional matrix wherein the first electrodes and the second electrodes are placed like stripes orthogonal to each other, each of the light modulation elements is formed at each of the intersection points of the first electrodes and the second electrodes, and simple matrix drive is executed.

In the light modulation element, the first electrodes are arranged in parallel, the second electrodes are arranged in parallel, orthogonal to the first electrodes, and the light modulation elements are formed at the intersection points of the first and second electrodes, thereby arranging the light modulation elements like a matrix. This configuration enables simple matrix drive to be executed for the light modulation elements.

The light modulation elements in this invention are arranged like a one-dimensional or two-dimensional matrix wherein either the first electrode or the second electrode is used as a pixel electrode, a switch mechanism for supplying an image signal to the pixel electrode is provided for each of the light modulation elements, and active matrix drive is executed.

In the light modulation elements, either the first electrode or the second electrode is used as a pixel electrode and a switch mechanism for supplying an image signal to the pixel electrode is provided for each of the light modulation elements, thereby arranging the light modulation elements like a one-dimensional or two-dimensional matrix, and active matrix drive can be executed. Thus, the light modulation elements can be driven easily and contrast can be more enhanced.

In the light modulation element in this invention, the guided light is ultraviolet light.

In the light modulation element, ultraviolet light for exciting the fluorescent material can be guided for executing light modulation. Since ultraviolet light excites the fluorescent material to emit light, visible light and infrared light can be easily provided and exposure and display at various wavelengths are enabled. Generally, a large number of types of fluorescent materials excited by ultraviolet ray to emit visible light exist and thus practical use is easily made.

In the light modulation element in this invention, a shield part is provided in an area other than the light emission part of the fluorescent material.

In the light modulation element, a shield part is provided in an area other than the light emission part of the fluorescent material, whereby to display an image, the contrast of the image can be more enhanced.

In the light modulation element in this invention, the guided light is single-color light and wherein the fluorescent material comprises a plurality of different luminescent colors.

In the light modulation element, the fluorescent materials of a plurality of different luminescent colors are caused to emit light, whereby any desired color can be displayed and color display can be produced easily.

In the exposure unit in this invention, the light modulation element is driven based on image information, whereby a record medium can be exposed to modulated light from the light modulation element.

In the flat-panel display unit of this invention, the light modulation element is driven based on image information, whereby an image can be displayed based on modulated light from the light modulation element.

DESCRIPTION OF THE PREFERRED EMBODIMENTS

Referring now to the accompanying drawings, there are shown preferred embodiments of light modulation elements, exposure units, and flat-panel display units according to the invention.

Figure 1:
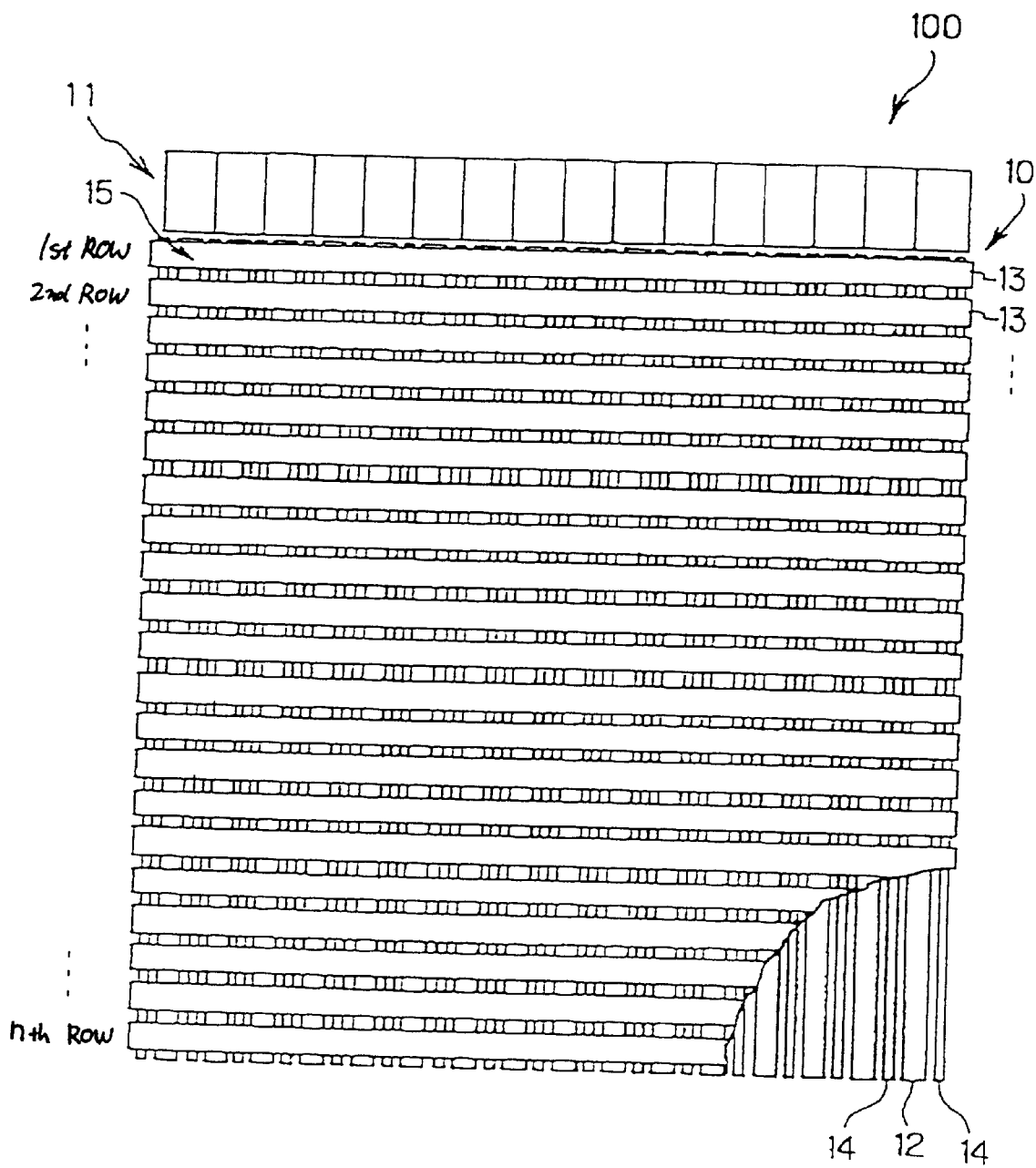
FIG. 1 is a general plan view of a flat-panel display unit in a first embodiment of the invention to show optical waveguides to which an LED array is connected.
Figure 2:
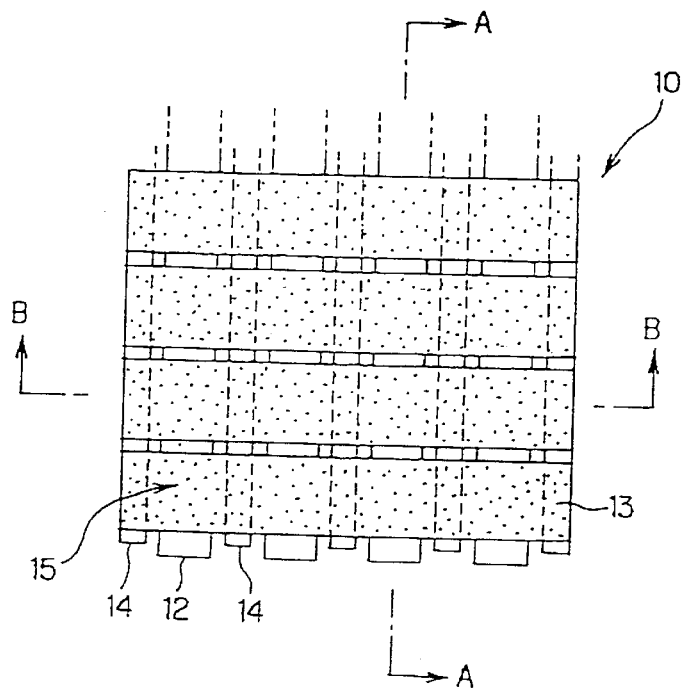
FIG. 2 is a partially enlarged plan view of the flat-panel display unit shown in FIG. 1.
Figure 3:
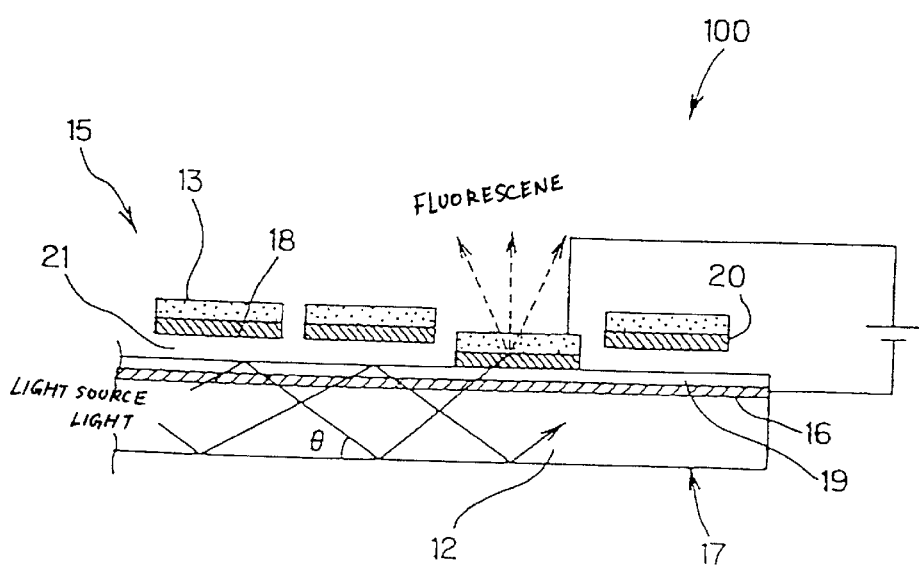
FIG. 3 is a sectional view taken on line A—A in FIG. 2.
Figure 4:
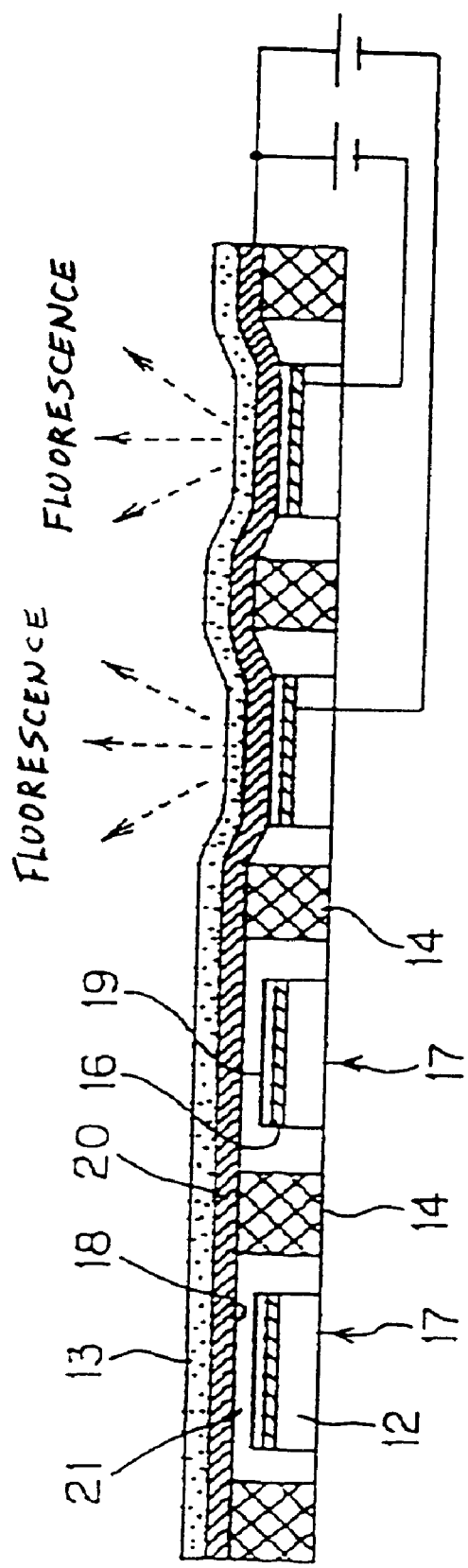
FIG. 4 is a sectional view taken on line B—B in FIG. 2.

FIG. 1 is a general plan view of a first embodiment of a flat-panel display unit according to the invention to show optical waveguides to which an LED array is connected. FIG. 2 is a partially enlarged plan view of the flat-panel display unit shown in FIG. 1. FIG. 3 is a sectional view taken on line A—A in FIG. 2. FIG. 4 is a sectional view taken on line B—B in FIG. 2.

A flat-panel display unit 100 of the embodiment comprises an LED array 11 used as a light source, a plurality of optical waveguides 12 formed in parallel as optical waveguide bodies optically connected to the LED array 11 via microlens (not shown), and a plurality of fluorescent materials 13 formed in parallel on the top of the optical waveguides 12, the fluorescent materials 13 being orthogonal to the optical waveguides 12, as schematically shown in FIG. 1. Each optical waveguide 12 is placed between spacers 14 formed in parallel with the optical waveguides 12 in the arrangement direction thereof.

The LED array 11 comprises a plurality of light emission parts placed in one dimension and the light emission parts are provided in a one-to-one correspondence with the optical waveguides 12 (for example, pixels).

FIG. 2 is a partially enlarged view of parts of the optical waveguides 12 and the fluorescent materials 13. According to FIG. 2, the intersection plane of the optical waveguide 12 into which light from the light source is guided and the fluorescent material 13 forms one light modulation element 15 and the light modulation elements 15 are arranged like a two-dimensional matrix, making up a light modulation element array 10.

Next, the configuration of the light modulation element 15 will be discussed specifically. Referring to FIG. 3, which is a sectional view taken on line A—A in FIG. 2, the light modulation element 15 schematically consists of a light guide plate 17 formed with a first electrode 16 along the optical waveguide 12, a flexible thin film 18 formed above the light guide plate 17 with a predetermined spacing, and a fluorescent material 13 formed on the top of the flexible thin film 18. An insulating layer 19 is formed on the top of the first electrode 16 of the light guide plate 17.

A metal oxide such as ITO in high electron density, a very thin metal film (aluminum, etc.,), a thin film comprising metal fine particles dispersed on a transparent insulator, a wide hand gap semiconductor doped in a high concentration, or the like can be preferably used as the first electrode 16.

Referring to FIG. 4, which is a sectional view taken on line B—B in FIG. 2, a spacer 14 is formed, between the adjacent light guide plates 17, higher than the insulating layer 19 of the light guide plate 17 and parallel with the light guide plate 17. For example, silicon oxide, nitride oxide, ceramics, resin, etc., can be used as the spacer 14.

Further, on the tops of the spacers 14, a transparent flexible thin film 18 having electric conductivity is formed above the light guide plates 17 with a predetermined spacing. A semiconductor of polysilicon, etc., insulation silicon oxide, nitride oxide, ceramics, resin, metal, etc., can be preferably used as the flexible thin film 18. The flexible thin film 18 is formed with a second electrode 20.

If the first electrode 16 and the second electrode 20 do not come in contact with each other in the configuration, the insulating layer 19 may be omitted and the spacer 14 and the flexible thin film may be formed of the same material.

A cavity 21 is formed between the insulating layer 19 and the flexible thin film 18 and the height of the cavity 21 is roughly determined by the height of the spacer 14; preferably, it is set to a height in the range of about 0.1 μm to 10 μm. The cavity 21 can be easily formed by etching a sacrificial layer, for example.

The second electrode 20 formed on the flexible thin film 18 may be formed of the same material as the first electrode 16 and the whole flexible thin film 18 may be formed as the electrode. The second electrode 20 may be placed at a position on either the light introduction (guide) side of the flexible thin film 18 or the opposite side.

Further, a fluorescent material 13 is formed on the top of the flexible thin film 18. In the embodiment, the fluorescent material 13 is formed on the surface of the flexible thin film 18 separately as a fluorescent material layer and the flexible thin film 18 and the fluorescent material 13 are provided by depositing two different layers on each other. A vacuum film formation method of evaporating an inorganic or organic fluorescent pigment or a general formation method of applying an inorganic or organic fluorescent pigment, etc., can be preferably adopted as formation means of the fluorescent material 13.

The fluorescent material 13 layer may be uniformly formed over the full face of the light modulation element array 10. In this case, fluorescent material layer patterning is simplified or becomes unnecessary and the fluorescent material layer formation process is simplified drastically.

Further, a black matrix as a shield portion (not shown) may be provided between the adjacent light guide plates 17 shown in FIG. 4 for enhancing the contrast of a display image. The spacers 14 themselves may be made to function as a black matrix for simplifying the process and enhancing the contrast.

According to the described configuration, the light modulation elements 15 are arranged like a two-dimensional matrix with a predetermined constant spacing with respect to the arrangement direction of the LED array 11 and the length direction of the optical waveguides 12. Of course, the light modulation elements 15 can also be formed like a one-dimensional matrix, according to which one-dimensional light modulation is enabled.

Next, the operation of the light modulation element 15 is as follows:

As the operation principle for electromechanically operating the flexible thin film 18 for executing light modulation, the coupling effect of totally reflected and guided light and near field light can be used by bringing the flexible thin film 18 and the insulting layer 19 on the light guide plate 17 side out of or into contact with each other.

With the light modulation element 15, if the cavity 21 is formed as light transmission resistance, light from the light source is totally reflected in the optical waveguide 12 and is not emitted to the flexible thin film 18 side, as shown in FIG. 3. On the other hand, if the flexible thin film 18 is brought into contact with the light guide plate 17 side, the light in the optical waveguide 12 is guided into the flexible thin film 18 (mode coupling). That is, the flexible thin film 18 is brought into contact with the light guide plate 17 side, whereby the light guided into the flexible thin film 18 excites the fluorescent material 13 for diffusing and emitting light, which is then emitted from the flexible thin film 18 and the optical waveguide 12. Thus, light is not emitted or is emitted, whereby light modulation can be executed.

More particularly, if the potential difference between the first electrode 16 and the second electrode 20 is zero (for example, 0 [V] is applied to both the electrodes) and the cavity 21 (for example, air) exists between the flexible thin film 18 and the light guide plate 17, letting the refractive index of the optical waveguide 12 be $n_w$, critical angle of total reflection, $\theta_c$, on the interface with air is $$\theta_c = \sin^{-1}(n_w)$$

Therefore, when incidence angle on the interface, θ, is larger than $\theta_c$, light travels while being totally reflected in the optical waveguide 12.

On the other hand, if drive voltage is applied to the first electrode 16 and the second electrode 20 and the flexible thin film 18 and the light guide plate 17 (insulating layer 19) are brought into contact with each other or close to each other by an electrostatic force produced due to the potential difference between the electrodes, light is guided into the flexible thin film 18 side, passes through the flexible thin film 18, and is emitted from the top of the flexible thin film 18, exciting the fluorescent material 13.

The operation of the flat-panel display unit 100 comprising the light modulation element array 10 having the light modulation elements 15 arranged like an array is as follows: The light modulation elements 15 on the same light guide plate 17 of the flat-panel display unit 100 are driven separately for light modulation by a controller (not shown). As shown in FIG. 1, the controller places one row of the light modulation elements 15 all in a light passing-through state and causes the light emitting parts of the LED array 11 of the flat-panel display unit 100 to output image signals of the display image corresponding to the one row of the light modulation elements 15. Then, the controller places the one row of the light modulation elements 15 all in a shield state. The sequence is repeated in the row order or every rows, thereby producing image display. In this case, the LED array 11 is driven and controlled at continuous-tone light emission strength, whereby it is made possible to display a continuous-tone image.

In the flat-panel display unit 100, the flexible thin film 18 is provided with the fluorescent material 13 and light incident on the flexible thin film 18 from the optical waveguide 12 is applied to the fluorescent material 13, which then is directly excited for emitting light. Therefore, the fluorescent material 13 can be caused to emit light in high efficiency.

The fluorescent material 13 is placed directly on the flexible thin film 18, whereby alignment of a flexible thin film substrate and a fluorescent material substrate required if the flexible thin film 18 and the fluorescent material 13 are provided on different substrates becomes unnecessary. Thus, the manufacturing process of the flat-panel display unit 100 can be simplified drastically and desired fluorescent materials can be excited for emitting light in a simple structure and with high accuracy.

Further, light from the LED array 11 is guided from the side of the light guide plate 17 (the left end part of FIG. 3) and is emitted from the surface of the light guide plate 17 (the upper side of FIG. 3), thus the light source placement space in the thickness direction of the light modulation element array 10 becomes unnecessary and the light modulation element array 10 itself can be easily thinned. Therefore, the whole flat-panel display unit 100 can be made compact and lightweight easily.

The described flat-panel display unit 100 can also be used as an exposure unit for exposing a photosensitive material, etc., to the light. To use the flat-panel display unit 100 as an exposure unit, digital multiple exposure can be executed. Thus, the flat-panel display unit 100 can be used particularly for an image recorder for forming an image by exposure to light, such as a printer, enabling record (print) at high speed.

Specifically, with a printer using a conventional exposure element, a constant area is exposed for a predetermined time, thus meanwhile a relative move between the exposure element and an image formation body is stopped. In contrast, with a printer using the above-described exposure unit, flexible thin films provided in a one-to-one correspondence with matrix electrodes are selectively driven, thereby enabling digital multiple exposure. Thus, line control can be performed while the exposure element and the image formation body are moved relatively; high-speed exposure is enabled and the record speed can be improved drastically.

Further, by making the most of digital multiple exposure, the exposure unit can also be used preferably for DDCP (digital direct color proof provided by merging electrophotographic technology and offset print technology and CTP (computer to plate) for forming an image directly on a lithographic plate and transferring the image, for example.

In this case, it is necessary to set the exposure wavelength to a wavelength fitted to a photosensitive material; this can be easily realized by preferably selecting fluorescent materials for emitting light at a desired wavelength.

Next, a second embodiment of a flat-panel display unit according to the invention will be discussed.

Figure 5:
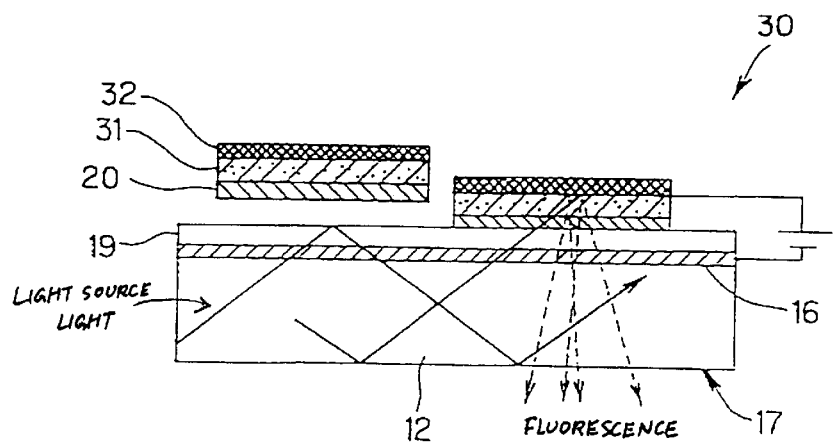
FIG. 5 is a sectional view of a light modulation element in a second embodiment of the invention.

FIG. 5 is a sectional view of a light modulation element 30 in the second embodiment taken on line B—B in FIG. 2. As shown in FIG. 5, the light modulation element 30 is similar to the light modulation element 15 in the first embodiment except that a reflection film 32 made of aluminum, etc., is formed on the top of a flexible thin film 31 having a fluorescent material, as shown in FIG. 5.

In the second embodiment, the flexible thin film 31 is formed of a resin material and a fluorescent material made of a fluorescent pigment of fine particles is mixed in the flexible thin film 31. That is, a material comprising fluorescent powder prepared so as to have necessary luminescent color, dispersed in a binder is formed as a film of uniform thickness on the flexible thin film by a screen print method, a spray method, an ink jet method, a file transfer method, or an application method.

In the light modulation element 30, if a voltage is applied to a first electrode 16 and a second electrode 20 and the second electrode 20 on the flexible thin film 31 side and a light guide plate 17 (insulating layer 19) are brought into contact with each other or sufficiently close to each other by a produced electrostatic force, light is guided into the flexible thin film 31 side and passes through the flexible thin film 31, exciting the fluorescent material in the flexible thin film 31. The fluorescence from the flexible thin film 31 is scattered isotropically; downward light is propagated to the light guide plate 17 side and upward light is reflected downward by the reflection film 32 and is propagated to the light guide plate 17 side.

Thus, in the light modulation element 30 of the embodiment, light is directly applied to the fluorescent material for exciting the fluorescent material, thus the light emission efficiency of the fluorescent material is enhanced, the light use efficiency of the emitted fluorescence is also enhanced by the reflection action of the reflection film 32, and high-intensity display can be produced. The flexible thin film and the fluorescent material can be formed of a single thin film and the electromechanical operation characteristic of the flexible thin film 31 can be stabilized.

For example, if a fluorescent material made of a fluorescent pigment of fine particles is mixed in the flexible thin film 31, the fluorescent material distributes uniformly and unevenness in light emission can be prevented. Since a fluorescent pigment of fine particles can be used, the flexible thin film and the fluorescent material can be formed at the same time, and resin has good workability, thus thin film formation is facilitated and a large number of flexible thin film materials and fluorescent materials can be used.

Further, the flexible thin film may be formed of a resin material and a fluorescent material made of an organic fluorescent dye may be melted into the flexible thin film 31 formed of a resin material.

In this case, the fluorescent material is melted, thus the flexible thin film can be formed while the fluorescent material is held with extremely good uniformity; occurrence of unevenness in light emission, etc., can be well prevented.

Next, a third embodiment of a flat-panel display unit according to the invention will be discussed.

Figure 6:
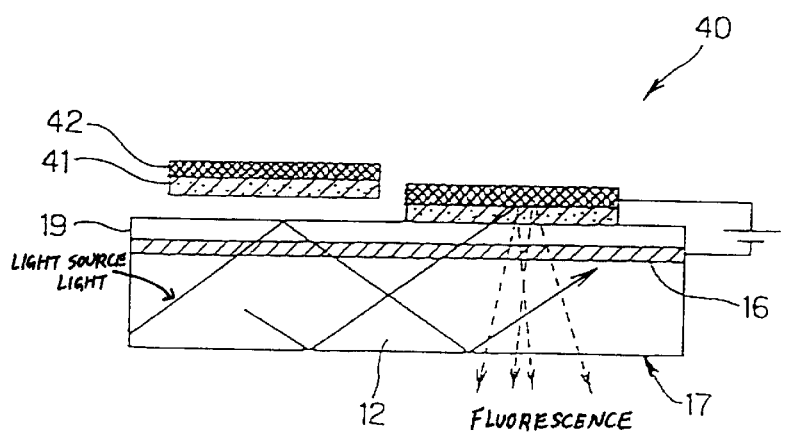
FIG. 6 is a sectional view of a light modulation element in a third embodiment of the invention.

FIG. 6 is a sectional view of a light modulation element 40 in the third embodiment. As shown in FIG. 6, the light modulation element 40 is similar to the light modulation element 30 in the second embodiment except that the second electrode of the second embodiment and a shield film are formed in one piece.

In the light modulation element 40, if a voltage is applied to a first electrode 16 and a reflection film 42 as a second electrode and a flexible thin film 41 and a light guide plate 17 (insulating layer 19) are brought into contact with each other or sufficiently close to each other by a produced electrostatic force, light is guided into the flexible thin film 41 side and passes through the flexible thin film 41, exciting the fluorescent material in the flexible thin film 41. The fluorescence from the flexible thin film 41 is scattered isotropically; upward light is reflected downward by the reflection film 42 and is propagated to the light guide plate 17 side and downward light is propagated to the light guide plate 17 side.

Thus, in the light modulation element 40 of the embodiment, as in the second embodiment, emitted fluorescence is reflected by the reflection film 42, whereby the light use efficiency is enhanced and higher-intensity display can be produced. In addition, the second electrode and the shield film are formed in one piece, thereby simplifying the element structure, thus the manufacturing process can be more simplified.

Next, a fourth embodiment of a flat-panel display unit according to the invention will be discussed.

Figure 7:
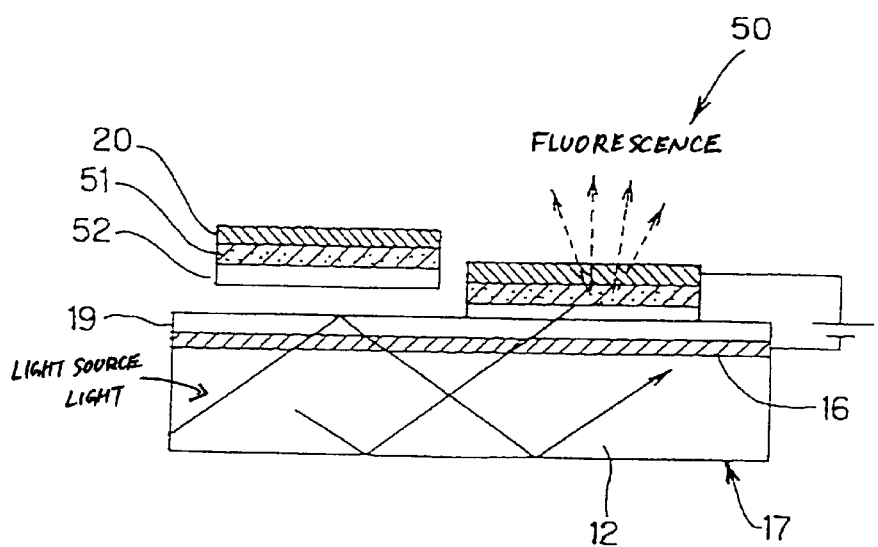
FIG. 7 is a sectional view of a light modulation element in a fourth embodiment of the invention.

FIG. 7 is a sectional view of a light modulation element 50 in the fourth embodiment. As shown in FIG. 7, the light modulation element 50 comprises a filter layer 52 having a characteristic of allowing light from a light source to pass through and reflecting fluorescence emitted by a fluorescent material, the filter layer 52 being placed between a flexible thin film 51 having a fluorescent material and a light guide plate 17. For example, a dielectric multilayer film, etc., is preferably used as the filter layer 52.

A second electrode 20 is placed on the top of the flexible thin film 51. The second electrode 20 is formed of a material transparent for fluorescence. Other components are similar to those of each of the above-described embodiments.

In the light modulation element 50, if a voltage is applied to a first electrode 16 and the second electrode 20 and the filter layer 52 on the flexible thin film 51 side and a light guide plate 17 (insulating layer 19) are brought into contact with each other or sufficiently close to each other by a produced electrostatic force, light passes through the filter layer 52 and is guided into the flexible thin film 51 side, exciting the fluorescent material in the flexible thin film 51. The fluorescence from the flexible thin film 51 is scattered isotropically; upward light passes through the second transparent electrode 20 and is propagated upward and downward light is reflected by the filter layer 52 and is propagated upward.

Thus, in the light modulation element 50 of the embodiment, as in the second and third embodiments, emitted fluorescence is reflected, whereby the light use efficiency is enhanced and higher-intensity display can be produced.

Next, a fifth embodiment of a flat-panel display unit according to the invention will be discussed.

Figure 8A:
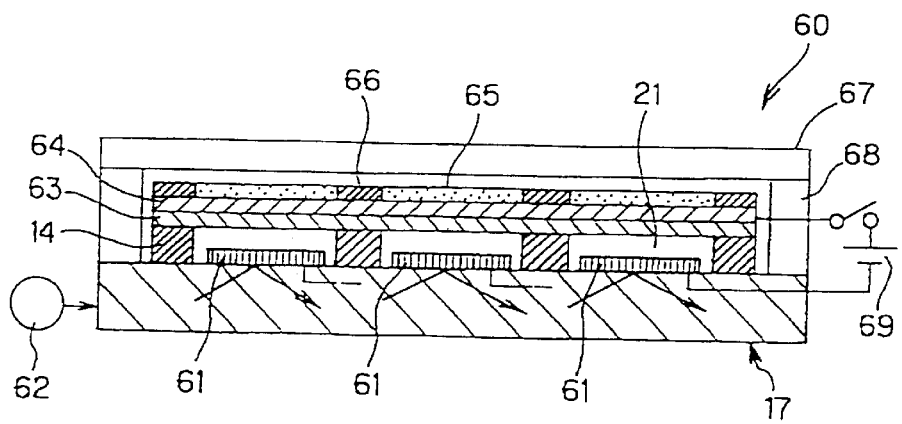
FIG. 8A is a sectional view to show the configuration of a light modulation element in a fifth embodiment of the invention.
Figure 8B:
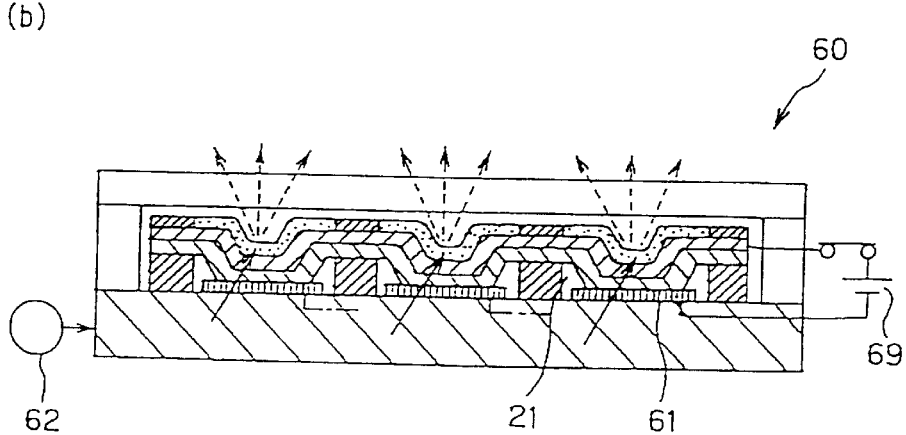
FIG. 8B is a sectional view to show the operation state of the light modulation element.
Figure 9:
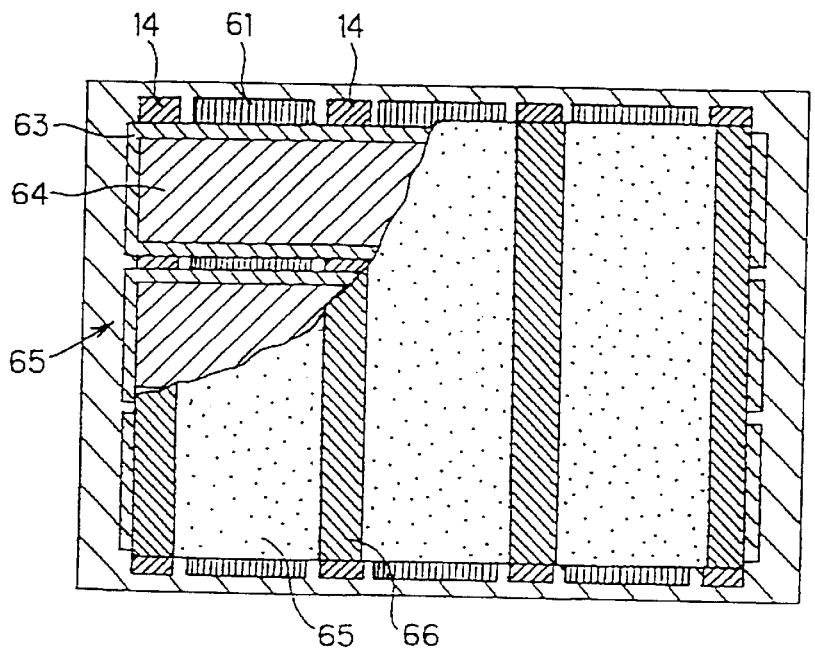
FIG. 9 is a plan view of a flat-panel display unit in FIG. 8.

FIGS. 8A and 8B show a light modulation element 60 in the fifth embodiment. FIG. 9 is a plan view of a flat-panel display unit 100. According to FIG. 8A, for the light modulation element 60 of the embodiment, a plurality of first electrodes (signal electrodes) 61 which are transparent and shaped like belts are formed in parallel with a predetermined spacing on a light guide plate 17. Spacers 14 each for separating the first adjacent electrodes 61 are formed on the light guide plate 17. An ultraviolet lamp (low-pressure mercury lamp) 62 as a light source is disposed on the side of the light guide plate 17 and light from the low-pressure mercury lamp 62 is propagated while being totally reflected repeatedly in the light guide plate 17.

The spacer 14 is formed on the upper end face with a transparent flexible thin film 63 at a position at a distance from the first electrode 61. Therefore, a cavity 21 is formed between the first electrode 61 and the flexible thin film 63.

On the top of the flexible thin film 63, a plurality of second electrodes (scan electrodes) 64 which are transparent and shaped like belts long in a direction orthogonal to the first electrodes 61 are formed in parallel in a predetermined spacing. That is, the first electrodes 61 and the second electrodes 64 are disposed like an orthogonal lattice, as shown in FIG. 9. The first electrodes 61 and the second electrodes 64 form matrix electrodes for enabling a specific counter electrode part to be specified by selecting a predetermined one.

The second electrode 64 is formed on the top with a fluorescent material 65 corresponding to the first electrode 61. The fluorescent materials 65 are placed in parallel to the first electrodes 61 and a black matrix 66 is formed between the adjacent fluorescent materials 65 for enhancing the contrast of a display image, as shown in FIG. 9.

Further, as shown in FIG. 8, a transparent front plate 67 is placed on a support 68 above the fluorescent materials 65 with a predetermined spacing between the front panel and the fluorescent materials.

A power supply 69 is connected to the first electrodes 61 and the second electrodes 64 and from the power supply 69, a voltage can be selectively applied to predetermined electrodes based on image information.

With the light modulation element 60, not only a transparent glass plate, but also a resin film, etc., of polyethylene terephthalate, polycarbonate, etc., for example, can be used as a material of the light guide plate 17.

The first electrodes 61 and the second electrodes 64 are formed of transparent conductive material, namely, metal or conductive metal compound generally put into fine particles and made transparent having an optical characteristic allowing ultraviolet rays to pass through. Gold, silver, palladium, zinc, aluminum, etc., can be used as the metal, and indium oxide, zinc oxide, aluminum-added zinc oxide (popularly called AZO), etc., can be used as the metal compound. Specifically, an $SnO_2$ film (Nesa film), an ITO film, etc., can be named.

The light guide plate 17, the first electrode 61, the flexible thin film 63, the second electrode 64, and the fluorescent material 65 make up a light modulation part 60a.

FIG. 8B is a sectional view to show the operation state of the light modulation element shown in FIG. 8A.

In the light modulation element 60, if drive voltage is applied to the first electrode 61 and the second electrode 64 from the power supply 69, the flexible thin film 63 is attracted onto the first electrode 61 side and is bent by the electrostatic operation caused by an electrostatic force, whereby from the light guide plate 17, light passes through the flexible thin film 63 for exciting the fluorescent material 65 to emit light, then the fluorescence is emitted. Therefore, voltage of the power supply 69 is selectively applied to the first electrodes 61 and the second electrodes 64 based on image information, whereby a desired image can be displayed. Such simple matrix drive can cause the light modulation elements to well modulate light.

Since the light modulation elements can be easily put into an array by etching the light guide plates 17, the first and second electrodes 61 and 64, the spacers 14, etc., the manufacturing costs can be reduced. Further, since light from the light guide plate 17 passes only through a pair of transparent electrodes with the cavity 21 between, the light is not absorbed fruitlessly and the light use efficiency can be enhanced.

The light modulation element may be provided with a color filter for selecting a wavelength for any light path, an interference filter, a reflection film, etc., for enhancing the fluorescence emission efficiency.

The space between the light guide plate 17 and the front plate 67 of the light modulation part 60a formed in one piece may be deaerated, then a rare gas may be poured for sealing the whole, thereby providing a flat-panel display unit intended for preventing the effect of disturbance for stabilization.

Next, a sixth embodiment of a flat-panel display unit according to the invention will be discussed.

Figure 10:
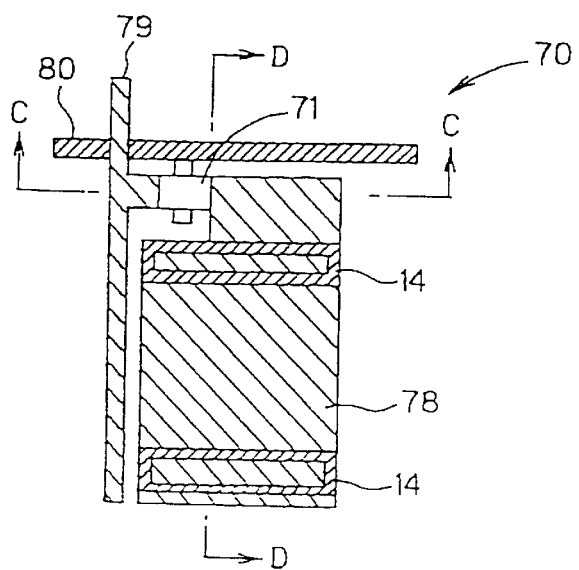
FIG. 10 is a plan view of a light modulation element in a sixth embodiment of the invention.
Figure 11:
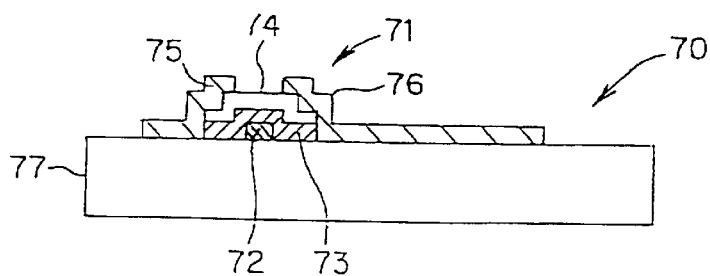
FIG. 11 is a sectional view taken on line C—C in FIG. 10.
Figure 12:
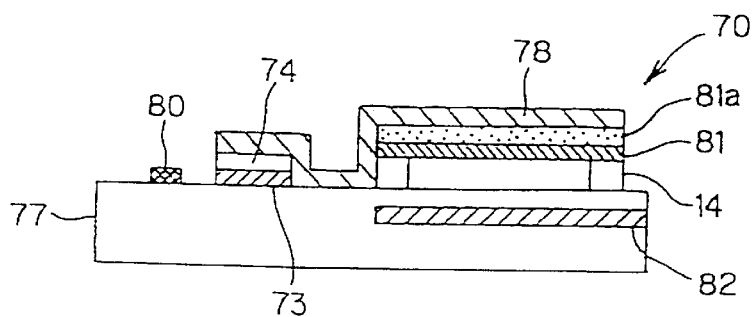
FIG. 12 is a sectional view taken on line D—D in FIG. 10.
Figure 13:
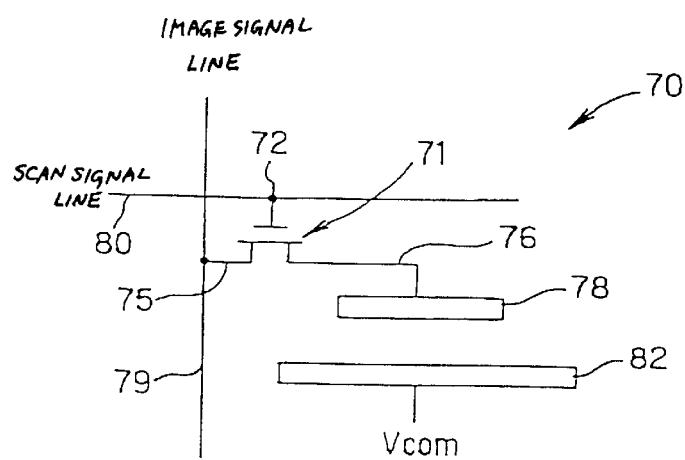
FIG. 13 is an equivalent circuit diagram of a pixel part shown in FIG. 10.

FIG. 10 is a plan view to show a light modulation element 70 of the sixth embodiment. FIG. 11 is a sectional view taken on line C—C in FIG. 10 and FIG. 12 is a sectional view taken on line D—D in FIG. 10. FIG. 13 is an equivalent circuit diagram of a pixel part shown in FIG. 10.

Simple matrix drive can be applied to the light modulation elements 60 of the fifth embodiment described above; the light modulation elements 70 of the sixth embodiment are controlled by active drive.

That is, in the light modulation elements 70 of the embodiment, an active element (for example, TFT) 71 is provided for each pixel. The TFT 71 is made up of a gate electrode 72, an insulating film 73, an a-Si:H layer 74, one electrode (drain electrode) 75, and one electrode (source electrode) 76. The TFT 71 is formed on a light guide plate 77 for guiding light from the end face thereof.

A transparent pixel electrode 78 is connected to the source electrode 76 of the TFT 71. An image signal line 79 for each column is connected to the drain electrode 75. A scan signal line 80 for each row is connected to the gate electrode 72.

The pixel electrode 78 is deposited on a fluorescent material 81a formed on the top of a flexible thin film 81 in the light modulation element 70. Spacers 14 are bridged with the flexible thin film 81. The light guide plate 77 is formed with an opposite electrode (common electrode) 82 transparent for light from the light source, opposed to the pixel electrode 78, and potential Vcom is applied.

When the described light modulation element 70 is operated, a voltage for bringing the TFT 71 into conduction is applied to the scan signal line 80 connected to the gate electrode 72. If a desired image signal voltage is applied to the image signal line 79 connected to the drain electrode 75, the drain electrode 75 and the source electrode 76 are brought into conduction. Therefore, the image signal voltage is applied to the pixel electrode 78, whereby an electrostatic force acts because of the voltage difference between the potential Vcom of the common electrode 82 and the potential of the pixel electrode 78, causing the flexible thin film 81 to be bent to the light guide plate 77 side. When the flexible thin film 81 is brought into contact with the light guide plate 77 or sufficiently close to the light guide plate 77, light is guided into the flexible thin film 81 side, passes through the flexible thin film 81, and excites the fluorescent material 81a on the top of the flexible thin film 81. Fluorescent from the fluorescent material 81a passes through the transparent pixel electrode 78 and is emitted upward.

After this, if the TFT 71 is brought out of conduction to scan another row, the above-described light modulation state is maintained and matrix modulation of more than one row is enabled.

Thus, also in the embodiment, desired light modulation can be executed as in the embodiments described above.

An optical filter may be placed in a light path for enhancing the fluorescence emission efficiency or the pixel electrode 78 may be made a reflection electrode for enhancing the fluorescence emission efficiency.

Next, a seventh embodiment of a flat-panel display unit according to the invention will be discussed.

Figure 14:
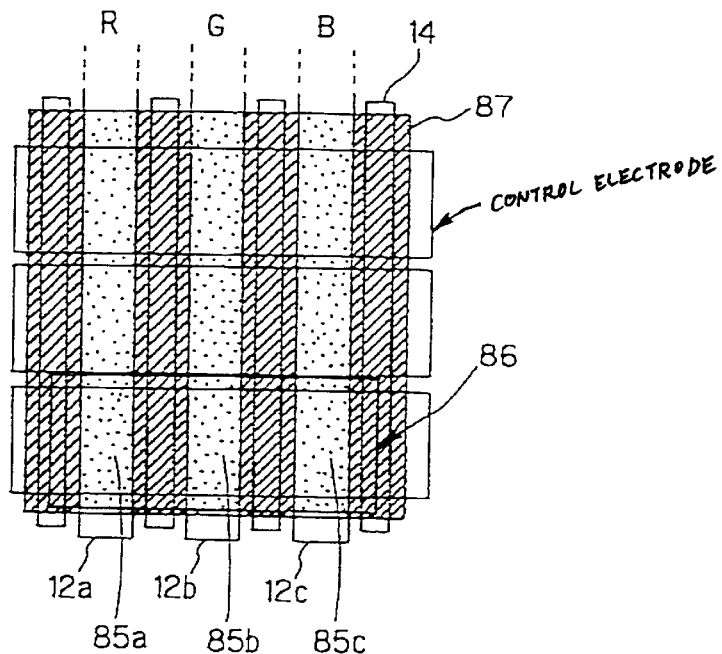
FIG. 14 is a partially enlarged view of optical waveguides in a seventh embodiment of the invention.

In the seventh embodiment, one optical waveguide is made to correspond to one color and one pixel is displayed by means of a plurality of optical waveguides, as shown in FIG. 14. That is, of light modulation elements arranged like a two-dimensional matrix, three light modulation elements 85a, 85b, and 85c in total formed on a red (R) display optical waveguide 12a, a green (G) display optical waveguide 12b, and a blue (B) display optical waveguide 12c adjacent to each other, for example, are made to correspond to a one-pixel area 86. Fluorescent materials corresponding to display colors are placed on the optical waveguides. A black matrix 87 is formed between the adjacent optical waveguides for enhancing the contrast of a display image.

This configuration enables color display to be produced in the primary three colors (for example, R, G, and B). In this case, LED, laser, EL, etc., can be named as a light source; particularly a light source for emitting ultraviolet rays is preferred. For example, a combination of a discharge lamp and a light modulator, LED, laser, inorganic EL, organic EL, fluorescent display tube, FED, CRT, etc., can be named as the light source for emitting ultraviolet rays.

Further, as a modified embodiment of the seventh embodiment, a plurality of light modulation elements each corresponding to one pixel may be provided for one optical waveguide and gradation drive may be executed with a plurality of light modulation elements of the same color, whereby if the light modulation elements are in a binary mode, multi-gradation drive in pixel units is enabled by performing drive control of the light modulation elements of the same color separately.

Figure 15:
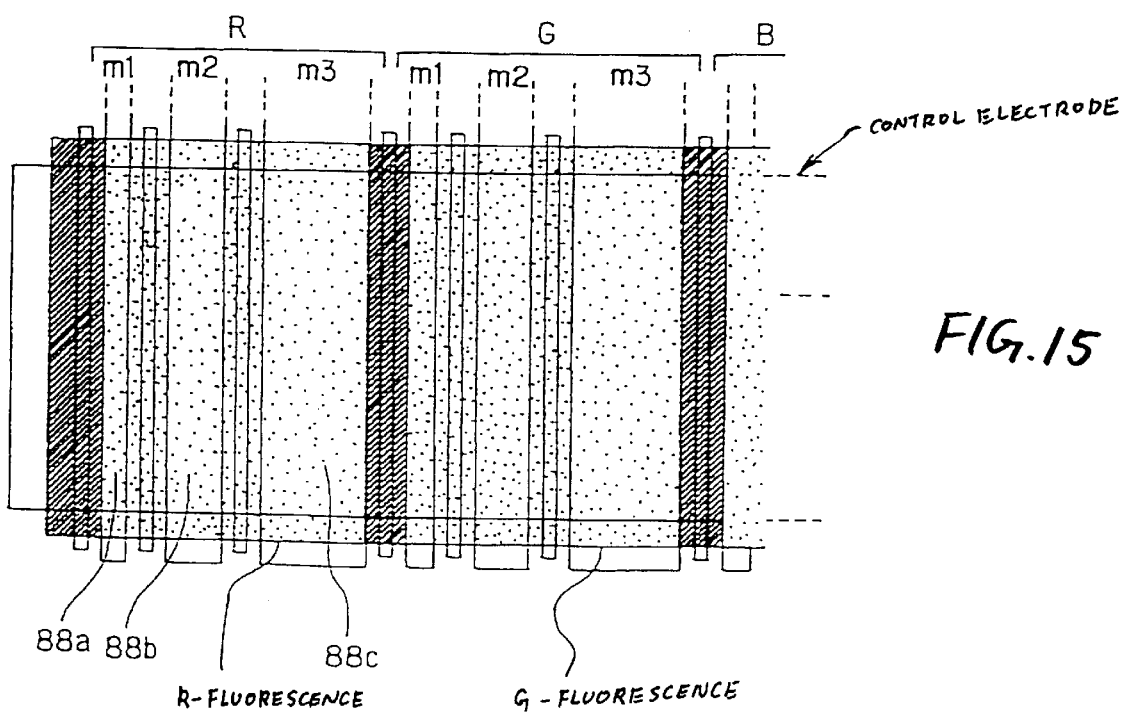
FIG. 15 is a partially enlarged view of optical waveguides to describe a modified embodiment of the seventh embodiment of the invention.
Figure 16:
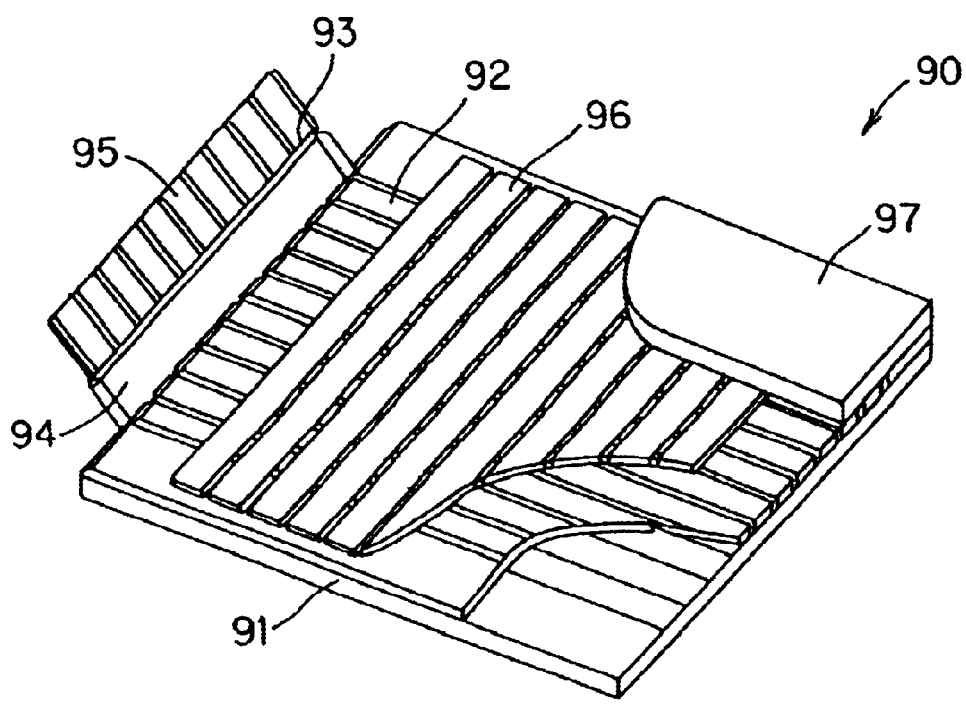
FIG. 16 is a partially cutaway view in perspective of a flat-panel display unit in a related art.
Figure 17:
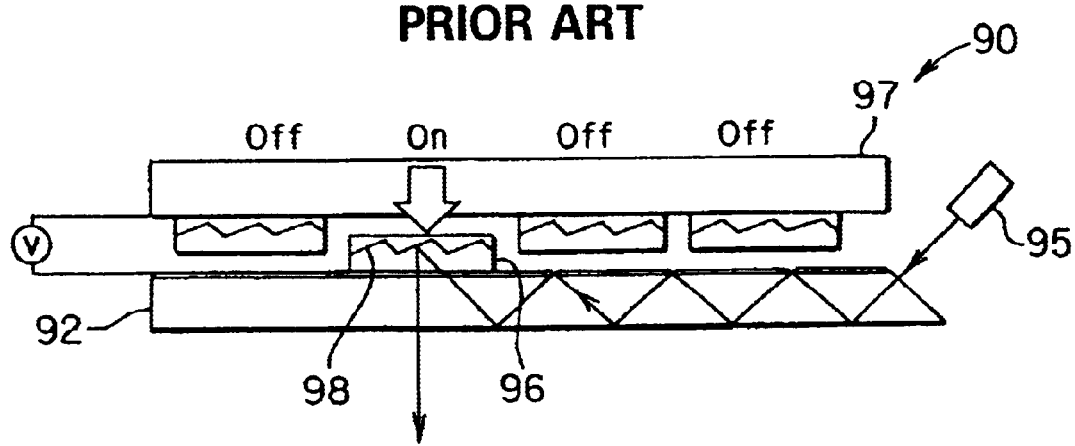
FIG. 17 is an enlarged sectional view of the main part of the flat-panel display unit shown in FIG. 16.

As shown in FIG. 15, in a one-pixel area, the light modulation elements of the same color may be divided into areas m1, m2, and m3 different in area. The area ratio of the areas m1, m2, and m3 is 1:2:4 and light modulation elements 88a, 88b, and 88c corresponding to the areas m1, m2, and m3 are driven and controlled separately.

The light modulation elements 88a, 88b, and 88c are provided for each color of R, G, and B of the three primary colors, for example, and are driven and controlled for each color.

According to the flat-panel display unit, the passing-through light quantity as the whole of one pixel is made different by turning on and off the light modulation elements 88a, 88b, and 88c in combination. Resultantly, if the binary state change of each light modulation part is made, eight levels of passing-through light quantity can be easily provided by using the binary state change of each light modulation part in combination.

As described in detail, the light modulation element of the flat-panel display unit according to the invention comprises the light guide body for guiding light from the light source and the flexible thin film having the fluorescent material, wherein the distance between the flexible thin film and the light guide body is changed by the electromechanical operation and light emission of the fluorescent material excited by the guided light is controlled. Since the flexible thin film is thus provided with the fluorescent material, the excited fluorescent material emits scattered light, so that the viewing angle dependency is lessened and the viewability can be improved drastically. Since the fluorescent material can be excited directly by single-color light guided into the flexible thin film from the light guide body, the fluorescent material can be caused to emit light in high efficiency and fluorescence of any desired wavelength can be emitted with the light source at low costs. Further, the fluorescent material is placed directly on the flexible thin film, thus alignment of a flexible thin film substrate and a fluorescent material substrate required if the flexible thin film and the fluorescent material are provided as separate bodies on the different substrates becomes unnecessary, the structure becomes simple, and the manufacturing process can be simplified.

The flexible thin film having the fluorescent material is formed with the reflection film, whereby the light use efficiency can be enhanced easily. The light modulation element can be preferably applied to an exposure unit and a flat-panel display unit.

What is claimed is:

1. A light modulation element comprising:
   a light guide body for guiding light from a light source, and
   a flexible thin film having a fluorescent material being formed opposing to said light guide body, wherein;
   distance between said flexible thin film and said light guide body is changed by electromechanical operation so that light emission of the fluorescent material being excited by the guided light is controlled.

2. The light modulation element as claimed in claim 1, wherein the electromechanical operation is performed by generating an electrostatic force between said flexible thin film and said light guide body.

3. The light modulation element as claimed in any one of claims 1 to 2, wherein said light guide body is formed with a first electrode, said flexible thin film is formed with a second electrode, and a voltage is applied to the first electrode and the second electrode so as to generate an electrostatic force.

4. The light modulation element as claimed in any one of claims 1 to 2, wherein the fluorescent material is a fluorescent layer formed on a surface of said flexible thin film.

5. The light modulation element as claimed in any one of claims 1 to 2, wherein said flexible thin film is made of a resin material and the fluorescent material made of a fluorescent pigment of fine particles is mixed in said flexible thin film.

6. The light modulation element as claimed in any one of claims 1 to 2, wherein said flexible thin film is made of a resin material and the fluorescent material made of an organic fluorescent dye is melted into said flexible thin film.

7. The light modulation element as claimed in any one of claims 1 to 2, wherein said flexible thin film is formed with a reflection film for reflecting light emitted by the fluorescent material toward said light guide body.

8. The light modulation element as claimed in claim 7, wherein the reflection film is used as a second electrode.

9. The light modulation element as claimed in any one of claims 1 to 2, wherein a filter layer for allowing light from the light source to pass through and reflecting light emitted by the fluorescent material is placed between the fluorescent material of said flexible thin film and said light guide body.

10. The light modulation element as claimed in any one of claims 1 to 2, wherein light from the light source is guided from a side of said light guide body.

11. The light modulation element as claimed in any one of claims 1 to 2, wherein light from the light source is guided from a surface of said light guide body on an opposite side to said flexible thin film.

12. The light modulation element as claimed in any one of claims 1 to 2, wherein said light guide body is an optical waveguide.

13. The light modulation element as claimed in claim 12 comprising:
   a plurality of parallel optical waveguides formed on a substrate;
   a plurality of light sources which can be controlled separately with at least one of the optical waveguides made to correspond to one pixel; and
   a plurality of flexible thin films orthogonal to the optical waveguides, wherein
      the quantity of light from the light source is changed and light emission of the fluorescent material excited is controlled by the electromechanical operation of the flexible thin film.

14. The light modulation element as claimed in claim 13, wherein the light source is a light emission array element.

15. The light modulation element as claimed in claim 13, wherein the light source is made up of a light emission body and a light modulation array element.

16. The light modulation element as claimed in any one of claims 1 to 2, wherein said light guide body is a light guide plate.

17. The light modulation elements as claimed in claim 16, wherein the light modulation elements are arranged in one-dimensional or two-dimensional matrix wherein the first electrodes and the second electrodes are disposed in stripe shape orthogonal to each other, each of said light modulation elements is formed at each of the intersection points of the first electrodes and the second electrodes so that a simple matrix drive is executed.

18. The light modulation elements as claimed in claim 16, wherein the light modulation elements are arranged in one-dimensional or two-dimensional matrix wherein either the first electrode or the second electrode is used as a pixel electrode, a switch mechanism for supplying an image signal to the pixel electrode is provided for each of said light modulation elements so that an active matrix drive is executed.

19. The light modulation element as claimed in any one of claims 1 to 2, wherein the guided light is ultraviolet light.

20. The light modulation element as claimed in any one of claims 1 to 2, wherein a shield part is provided in an area other than the light emission part of the fluorescent material.

21. The light modulation element as claimed in any one of claims 1 to 2, wherein the guided light is single-color light and wherein the fluorescent material comprises a plurality of different luminescent colors.

22. An exposure unit using a light modulation element as claimed in any one of claims 1 to 2.

23. A flat-panel display unit using a light modulation element as claimed in any one of claims 1 to 2.

* * * * *